March 25, 1930. F. WUNSCH 1,751,538
SYSTEM OF FREQUENCY OR SPEED MEASUREMENT AND CONTROL
Filed March 27, 1925 2 Sheets-Sheet 1
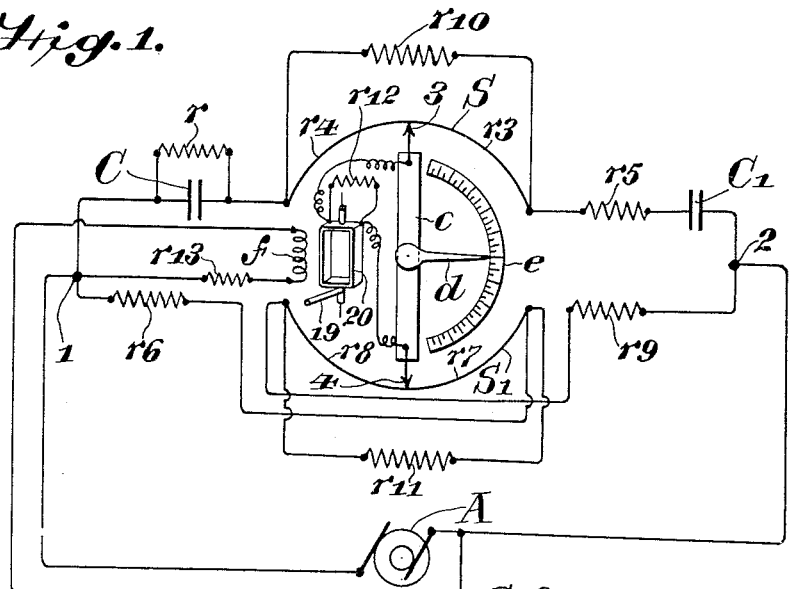
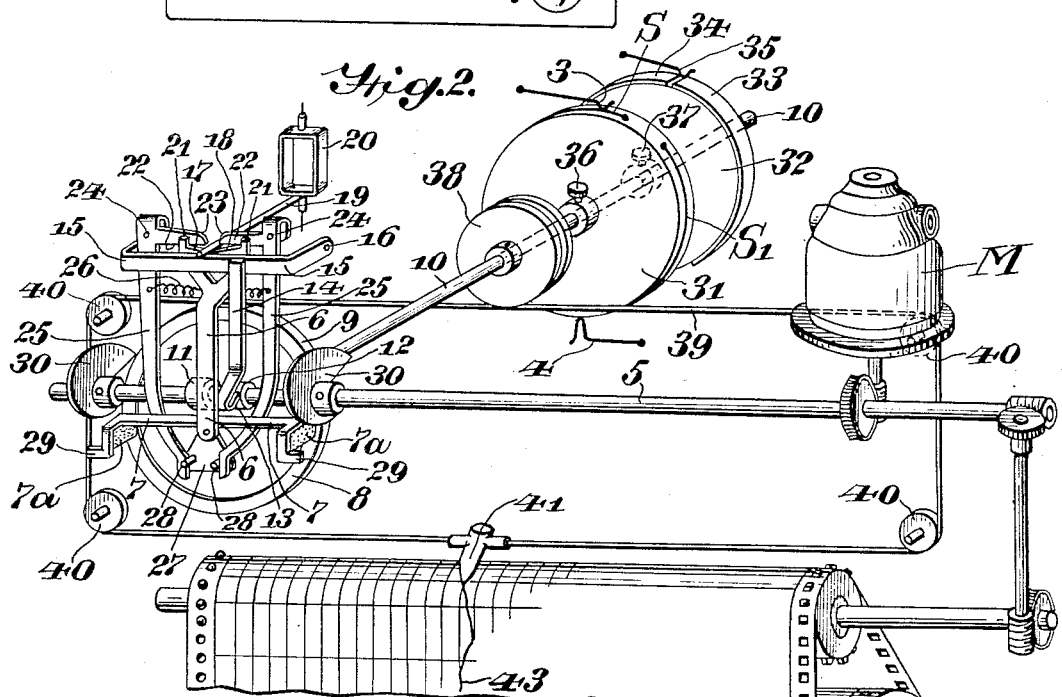
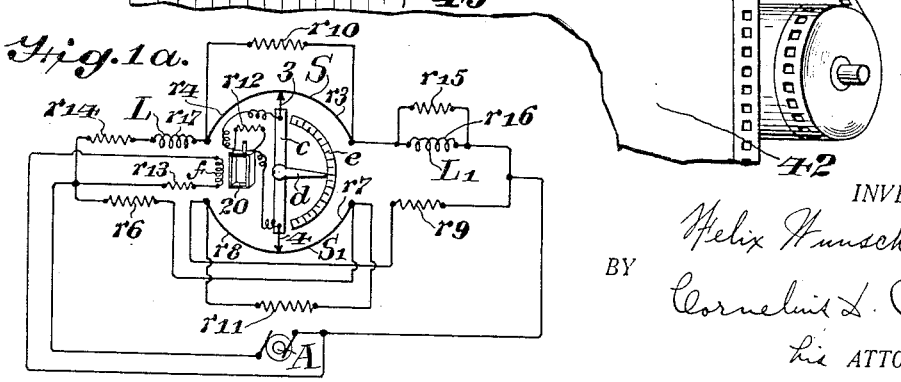
INVENTOR.
Felix Wunsch
BY Cornelius D. Ehret
his ATTORNEY.

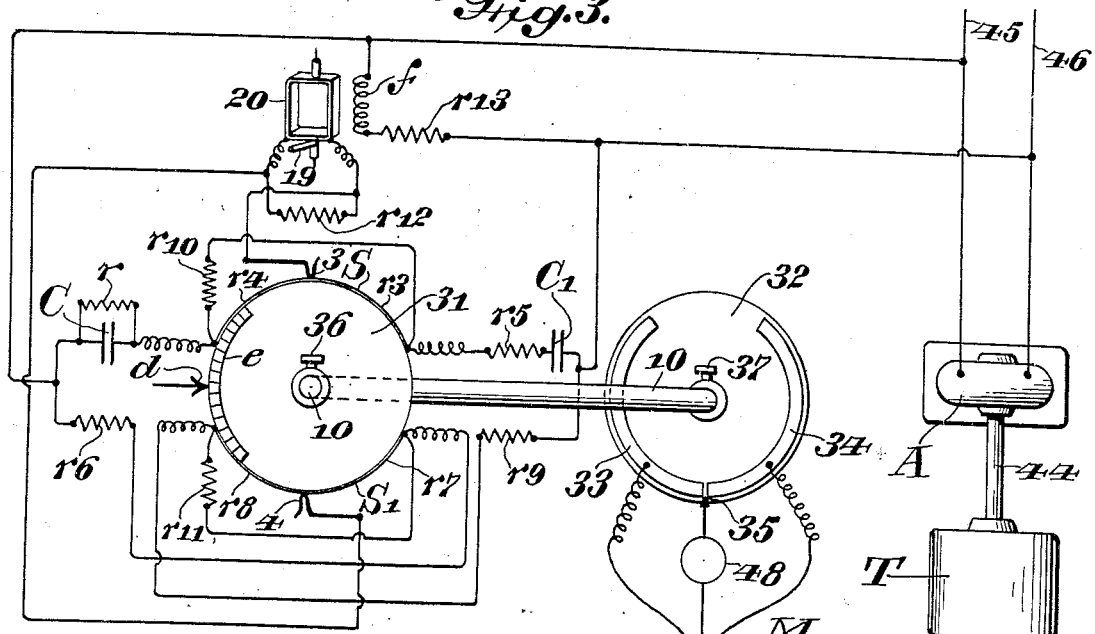
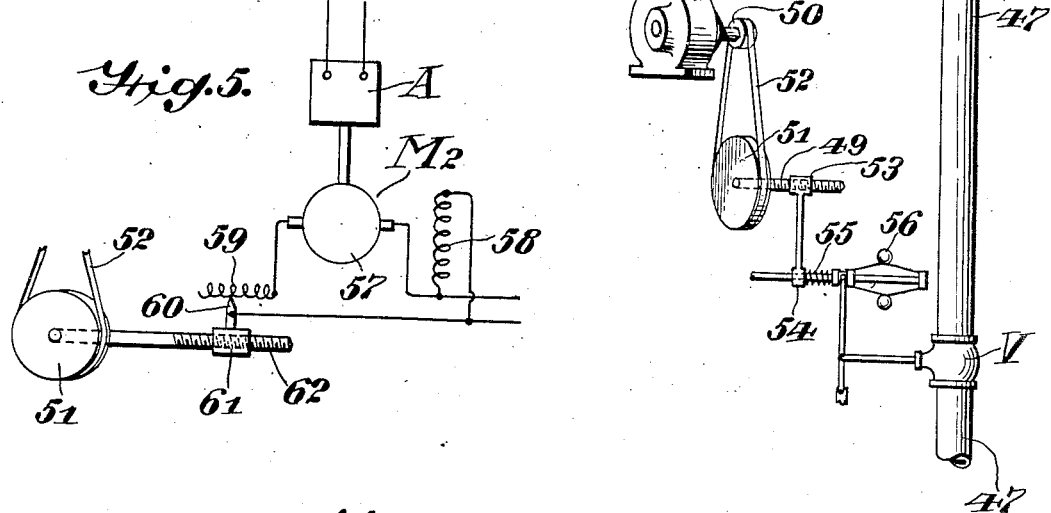
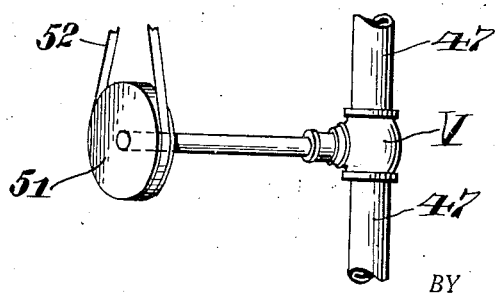

Patented Mar. 25, 1930

1,751,538

UNITED STATES PATENT OFFICE

FELIX WUNSCH, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

SYSTEM OF FREQUENCY OR SPEED MEASUREMENT AND CONTROL

Application filed March 27, 1925. Serial No. 18,794.

My invention relates to a system for measuring or recording the frequency of a fluctuating or alternating current or the speed of a moving system.

In accordance with my invention, there is utilized a Wheatstone bridge with which is employed an alternating current galvanometer and whose arms comprise impedances (which term includes non-inductive resistances and reactances, either capacitative or inductive), with means for so varying or adjusting the relative magnitudes of the impedances in the bridge arms of each of two pairs of bridge arms to effect a balance for each of various frequencies by effecting equality between three ratios, such as the ratio of the resistance components of the impedances of two arms, the ratio of the reactance components of the impedances of two arms, and the ratio of the impedances of two other arms, whereby variation of relation between the phases of the galvanometer field current and of the current in the bridge is avoided.

More particularly in accordance with my invention, and preferably, there are utilized in a bridge arm a condenser with a resistance in shunt thereto, and in another arm a condenser and a resistance in series therewith, and in the remaining arms resistances, with slide wire or adjustable resistances between the arms of each pair of arms for effecting for each of various frequencies the aforesaid equality of three ratios.

Further in accordance with my invention, there is provided in association with the movable structure effecting the adjustment of the slide wire or adjustable resistances a scale and pointer for directly reading frequencies, speeds or equivalents thereto.

Further in accordance with my invention, the galvanometer of the Wheatstone bridge controls a moving system or movable structure serving to rebalance the bridge, and also to produce a record of frequency or speed variation.

My invention resides in a method and apparatus of the character hereinafter described and claimed.

For an understanding of my method, and for an illustration of some of the various forms my apparatus may take, reference is to be had to the accompanying drawings, in which:

Fig. 1 is a diagrammatic view of apparatus suitable for practicing my method and embodying my invention in one of its forms; and Fig. 1$^a$ is a modification.

Fig. 2 is a fragmentary perspective view of recording and control mechanism utilizable in accordance with my invention.

Fig. 3 is a diagrammatic view of a system for controlling speed or frequency.

Figs. 4 and 5 are fragmentary views of modified forms of speed or frequency-controlling means.

Referring to Fig. 1, A is a generator or source of alternating or fluctuating current whose frequency is to be measured or indicated. Its terminals are connected, respectively, to the conjugate terminals or points 1 and 2 of a Wheatstone bridge whose other conjugate points are at the points of engagement of the contacts 3 and 4 movable along the slide wires or adjustable resistances $S$ and $S^1$, respectively. In the first bridge arm is included a condenser $C$, shunted by the non-inductive resistance $r$, in series with that portion $r^4$ of the non-inductive resistance $S$ lying to the left of the contact 3. In the second bridge arm are included the condenser $C^1$, non-inductive resistance $r^5$, and the non-inductive resistance $r^3$ constituting the remainder of the resistance $S$ to the right of the contact 3. In the third bridge arm are included the non-inductive resistance $r^6$ and the portion $r^7$ of the slide wire resistance $S^1$ to the right of the contact 4. In the fourth bridge arm are the resistance $r^8$ constituting the remainder of the resistance $S^1$ to the left of the contact 4, and the non-inductive resistance $r^9$.

In case the resistances $S$ and $S^1$, which may be in the form of simple wires or in the form of helices along which the contacts 3 and 4 move, are not by themselves of exactly correct values, they may, as well understood in the art of slide wires, be shunted by resistances such as $r^{10}$ and $r^{11}$, respectively, to ensure between their terminals exactly the correct or desired amount of resistance.

It is desirable that all of the resistances aforementioned shall have small or substantially zero temperature co-efficient, to avoid influence of temperature upon the measurements.

While the source A is in one conjugate conductor of the bridge, in the other, between the contacts 3 and 4, is connected the movable coil 20 of a galvanometer having the deflecting pointer or needle 19. The coil winding 20 may, as well understood in the art, be shunted by a resistance $r^{12}$, of suitable magnitude. The alternating magnetic field of the galvanometer is produced by current from the source A traversing the galvanometer field winding or coil $f$, in series with which may be connected the resistance $r^{13}$.

The phase angle of the current exciting the galvanometer field magnet winding $f$ with respect to the impressed electromotive-force may change or vary from various causes, such, for example, as temperature changes of the winding $f$, change in magnitude of the impressed voltage, etc. Such a change of phase of the field-exciting current will introduce error in the measurements unless means are provided to make possible a true balance of the bridge regardless of the shifting of phase of the field-exciting current of the galvanometer. To this end it is essential that three ratios shall be equal for all frequencies within the range to be measured by the bridge. This equality of ratios is expressed by the following equation:

$$\frac{r^1}{r^2} = \frac{d^1}{d^2} = \frac{a}{b} \quad (1)$$

in which: $r^1$ and $d^1$ are, respectively, the resistance and reactance components of one arm of the bridge, as, for example, the aforesaid first arm including C, $r$ and $r^4$; $r^2$ and $d^2$ are, respectively, the resistance and reactance components of another arm of the bridge, for example, the aforesaid second arm including $r^3$, $r^5$ and $C^1$; and $a$ and $b$ are, respectively, the resistances or impedances of the other arms of the bridge, for example, the aforesaid third and fourth arms including, respectivey, $r^6$; $r^7$ and $r^8$, $r^9$.

In the example illustrated in Fig. 1, where condensers are employed, it is desirable and preferable that they be low loss condensers, to avoid phase angle or capacity changes with temperature changes, and are preferably mica condensers of the best type.

The combination of a condenser, as C, with a shunting resistance, as $r$, is the equivalent or has the characteristics of a condenser having considerable losses, which may be expressed in terms of an equivalent resistance which changes in magnitude with changes in frequency. Accordingly, the aforesaid resistance $r^1$ is not the actual non-inductive resistance $r$ plus $r^4$, but is an apparent, fictitious or equivalent alternating current resistance which, however, changes in magnitude with changes in frequency, and comprises not only the resistances $r$, $r^4$, but, in addition, the apparent or fictitious resistance corresponding with the losses, if any, of the condenser C per se, and of the combination of the condenser C with its shunting resistance $r$. The aforesaid resistance $r^2$ corresponds with the sum of the resistances $r^3$ and $r^5$ and the apparent or fictitious resistance, variable with frequency, due to the losses of the condenser $C^1$, if any. However, when the condenser $C^1$ is a high grade mica condenser, with low loss, we may write $$r^2 = r^3 + r^5 \quad (2)$$

It is further true that $$r^1 = \frac{r}{1+\omega^2 C^2 r^2} + r^4 \quad (3)$$

and $$d^1 = \frac{\omega C r^2}{1+\omega^2 C^2 r^2} \quad (4)$$

and $$d^2 = \frac{1}{\omega C^1} \quad (5)$$

In Equations (3), (4) and (5), $\omega$ (omega) is $2\pi$ times the frequency; C and $C^1$ are, respectively, the capacities of the condensers C and $C^1$; and $r$ and $r^4$ are the magnitudes of the resistances $r$, $r^4$. Equations (3), (4) and (5) are well known to those skilled in the alternating current art, and from them are determinable the proper values of the several resistances and capacities to be utilized in an arrangement such as indicated in Fig. 1 for measuring a desired range of frequencies, it being understood that the contacts 3 and 4 are moved in unison with each other became attached to the same movable member $c$ carrying the pointer $d$ and co-acting with the stationary scale $e$ calibrated in terms of frequency, speed, or both, or any equivalent of them. The contacts 3 and 4 take a different position for each different frequency, in order to balance the bridge for that frequency, in which event the galvanometer coil 20 is in its zero or non-deflecting position.

From the foregoing, it will be understood that the function of the slide wire $S^1$ is to change the ratio of the resistances in the third and fourth arms of the bridge in proportion to the change in the ratio of the effective resistance and reactance in the first and second arms of the bridge in order that the equality of ratios expressed in Equation (1) shall obtain, whereby the bridge may be truly balanced regardless of changes of the phase angle of the current in the galvanometer field $f$.

While measurement of frequency has been described in connection with Fig. 1, it will be understood that speed or any other magnitude proportional to frequency may similarly be measured. For example, the speed of a rotating member may be measured by driving an alternating current generator, as A, by such member, and then measuring the frequency of the current delivered by the generator.

It shall be understood that my invention includes equivalents of the arrangement shown in Fig. 1, for it will be understood that in lieu of or with resistances $r^6$ and $r^9$ may be utilized either inductive or capacitative reactances, and that the slide wire $S^1$ may represent an inductive reactance, variable portions of which are included in the neighboring bridge arms, or may represent complementarily variable capacities included in the neighboring bridge arms. Furthermore, it will be understood that in the first and second bridge arms there may be used inductive reactances, and that the slide wire S may be inductive, or may be complementarily variable capacities connected in the neighboring bridge arms.

In Fig. 1ᵃ is shown such a generally equivalent arrangement in which in the first bridge arm are the serially related inductance L and resistance $r^{14}$, and in the second bridge arm the inductance $L^1$ shunted by a resistance $r^{15}$. It will be understood that the total resistance of the first arm of the bridge comprises the resistance $r^4$, the resistance of the conductor of the inductance L, and the resistance $r^{14}$, which last is present as a separate unit if the resistance of the conductor of the inductance L is not itself sufficient.

In this case again Equation (1) applies. $r^1$ and $d^1$ are the resistance and reactance components of one arm of the bridge, as for example, the first arm including L, $r^{17}$, $r^{14}$; $r^2$ and $d^2$ are respectively the resistance and reactance components of another arm of the bridge, for example the second arm including $r^3$, $r^{15}$, $r^{16}$ and $L^1$; and $a$ and $b$ are, respectively the resistances or impedances of the other arms of the bridge, for example the third and fourth arms including respectively $r^6$, $r^7$ and $r^8$, $r^9$.

$$r^1 = r^{14} + r^{17} + r^4$$

$$d^1 = \omega L$$

$$r^2 = \frac{r^{15}r^{16^2} + r^{15^2}r^{16} + \omega^2 L^{1^2} r^{15}}{(r^{15} + r^{16})^2 + \omega^2 L^{1^2}} + r^3$$

$$d^2 = \frac{\omega L^1 r^{15^2}}{(r^{15} + r^{16})^2 + \omega^2 L^{1^2}}$$

$$a = r^6 + r^7 \quad b = r^8 + r^9$$

$r^{16}$ = resistance of inductance $L^1$
$r^{17}$ = resistance of inductance L

The arrangements of Figs. 1 and 1ᵃ, or equivalents thereof, are utilizable for recording and controlling frequency and speed by recourse to any suitable recording and control mechanism, one example of which is illustrated in Fig. 2, and corresponding with a structure of the character disclosed in prior Letters Patent of the United States to Leeds No. 1,125,699, January 19, 1915.

Referring to Fig. 2, M is an electric motor or other suitable source of power rotating the shaft 5 at substantially constant speed. A lever 6 is pivoted at its upper end on a horizontal axis and has pivoted thereto on a horizontal axis at its lower end the arm 7, on each end of which is a shoe 7ᵃ, of cork or the like, frictionally engaging the rim 8 of the clutch disk or wheel 9, secured upon the shaft 10 of the movable structure or system. Secured upon the shaft 5 is a cam 11, which periodically engages the lever 6 and moves it outwardly, in opposition to a spring, not shown, thereby lifting the shoes 7ᵃ from the rim 8, the spring returning the shoes into engagement with the rim after predetermined rotation of the cam 11. Upon the shaft 5 is secured a second cam 12, which, after the shoes 7ᵃ have been lifted from the rim by the cam 11, actuates the finger 13 on the lower end of the arm 14 secured at its upper end to the member 15 pivoted on a horizontal axis at 16. Upon the member 15 is secured the member 17, whose upper edge 18 is inclined outwardly from the center. Disposed immediately above the edge 18 is the aforesaid needle or pointer 19 of the alternating current galvanometer whose coil is 20. At the opposite ends of the member 17 are the abutments 21 for limiting the deflection of the needle 19. Directly above the needle 19 and beneath which it normally freely swings are the edges 22, preferably straight and horizontal, upon the members 23, 23 pivoted at 24, 24, and extending toward each other, leaving a gap of sufficient width between their inner ends for free entry of the needle 19 when in balanced or zero position, corresponding with a balance of the Wheatstone bridge of the character shown in Figs. 1 and 3. The needle 19 normally swings freely between the edge 18 and the members 23, 23, which latter have downwardly extending arms 25, 25, biased toward each other by the spring 26. Attached to the lower end of the arm or lever 6 is a triangular plate 27 carrying the pins 28, 28, co-operating with the lower ends of the members 25, 25. At opposite ends of the arm 7 are the lugs 29, 29, adapted to be engaged by the cams 30, 30, similar in shape and similarly positioned and secured upon the shaft 5.

As the galvanometer needle 19 deflects in the one direction or the other, the shaft 10 will be rotated in the one direction or the other, and to an extent corresponding to the extent of the galvanometer deflection. For example, when the needle 19 deflects to the right, Fig. 2, due to periodic vertical movement of member 15 by cam 12, the needle 19 is clamped between the inclined edge 18 and lower edge 22 of the right hand member 23 causing the arm 25 to be tilted in a clockwise direction about its pivot 24, thereby pushing the right hand pin 28 on plate 27, and so tilting the movable or driving clutch or arm 6 in a clockwise direction while cam 11 is holding shoes $7^a$, $7^a$ from the rim 8 of clutch wheel 9, the angular movement of the member 6 being dependent upon the degree of deflection of needle 19. The cam 11 soon thereafter allows the shoes to again grip the rim 8 of wheel 9 and soon thereafter the left hand cam 30 engages the ear 29, which has been elevated, pushing it downwardly due to rotation of shaft 5, to restore it to the horizontal position indicated, but in so moving back to normal position the clutch member rotates the disk 9 and shaft 10 affixed thereto in a counter-clockwise direction.

Secured upon the shaft 10 is a disk 31 of insulating material, carrying upon its periphery the aforesaid resistances or impedances S, $S^1$, which in this example, as indicated in Fig. 3, are rotated, while their co-acting contacts 3 and 4 are stationary. Secured upon the shaft 10 is a second disk 32 carrying the arcuate contacts 33 and 34, with which co-acts the stationary contact or brush 35. The disks 31 and 32 are adjustable to any suitable angles with respect to each other and with respect to the shaft 10 by suitable set screws 36 and 37.

Secured upon the shaft 10 is the grooved pulley wheel 38, around which is wrapped the cord 39, which passes over the idler rollers 40 and has attached thereto the pen or marker 41 for drawing upon the record sheet or paper 42 a mark or record 43 of the changes of frequency or speed. The paper 42 is driven by the motor M, as well understood in the art. Disk 31 may carry the frequency or speed scale $e$ co-acting with stationary pointer $d$.

Referring to Fig. 3, the movable structure or system of Fig. 2 is shown in so far as it comprises the shaft 10 and the disks 31 and 32. The slide wires S, $S^1$ are comprehended in a Wheatstone bridge of the character indicated in Fig. 1.

A turbine or other source of power, or generically a rotating system, T, drives the alternating current generator or source A related to the bridge of Fig. 3 as the source A is related to the bridge in Fig. 1. The source A in this instance may be a small alternating current generator driven by the rotary structure T through the shaft 44 for purposes merely of measuring or controlling the speed of the device T. Or it may be an alternating current generator of large capacity for supplying current to any suitable load connected to the supply circuit conductors 45 and 46, in which case the frequency or speed of T and A may be controlled by controlling the opening of the valve V controlling the rate of supply of motive fluid or steam through the pipe 47 to the turbine T. In this case the brush 35 with contacts 33 and 34 control the reversible electric motor $M^1$ receiving current from any suitable source, as 48. When the disk 32 is in the position indicated in Fig. 3, the motor $M^1$ is deenergized, and this condition corresponds with balance of the Wheatstone bridge for the desired speed or frequency of the turbine T or generator A. Should the speed or frequency rise, the Wheatstone bridge will be unbalanced, causing a deflection of the galvanometer and its needle 19, causing in turn a rotation of the shaft 10 to an extent corresponding with the extent of unbalance of the bridge, and in such direction that the contact 33, for example, will be brought into engagement with the contact 35, energizing the motor M which runs in a certain direction, rotating the shaft 49, through any suitable great gear reduction, generically represented by the pulleys 50, 51 and belt 52, thereby causing the member 53 to advance upwardly along the threaded shaft 49, carrying the abutment 54 upwardly, with resultant tendency to compress the spring 55, which opposes the fly ball governor 56, driven by the turbine or device T, to partially close the valve V, causing reduction in speed and frequency. Similarly, when the frequency or speed diminishes, the motor M will be energized through contacts 34 and 35, and will rotate in the opposite direction, and effect an increase in the opening of the valve V, with resultant increased speed and frequency. In both cases the speed or frequency is varied or changed toward the desired frequency, at which the contact 35 is in engagement with neither of the contacts 33 and 34, and the bridge is in balance. When the frequency or speed changes from the desired magnitude, the Wheatstone bridge is unbalanced, the galvanometer deflects, and the disks 31 and 32 are rotated by the shaft 10 in a direction tending to balance the bridge and cause a change in the speed or frequency back toward the desired magnitude, and when this condition is reached or obtains the bridge is in balance and the motor $M^1$ is deenergized.

The governor 56, or its equivalent, at a given setting, or position of abutment 54, is effective of itself to maintain the speed of the system or frequency of the alternator with a range of variation broader than is suitable or desirable. In the arrangement described, by modifying automatically in accordance with change of frequency the action or setting of the governor, the range of variation of speed or frequency is materially reduced to a practically negligible amount. The speed or frequency may be considered substantially constant, less than $\frac{1}{10}$ of 1% variation being obtained in actual practice.

At the same time, the automatic system produces a record of the speed or frequency upon the record paper 42, or indicates speed or frequency by scale *e* on disk 31.

In lieu of the valve control mechanism indicated in Fig. 3, there may be utilized that indicated in Fig. 4, where through suitable reducing gearing, the motor $M^1$ rotates the valve stem to effect partial closure or opening of the valve V upon increase or decrease of speed or frequency. In either of the valve arrangements of Figs. 3 and 4, it will be understood that the valve may be either in the main steam or motive fluid line, or may be in a by-pass, and that the governor 56 of Fig. 3 may be either the main governor or an auxiliary governor of the turbine T.

In Fig. 5 there is fragmentarily indicated an alternating current generator or source A, either solely for speed measurement, or for supplying current to a consumption circuit, as in Fig. 3. In this case, however, the turbine T is replaced by an electric motor $M^2$, such, for example, as a shunt motor, having the armature 57 and shunt field 58, with a variable resistance 59 in the armature circuit, or in the field circuit if desired, and adjusted by the contact 60 moved by the nut 61 movable along the threaded shaft 62 driven through suitable reduction gearing by the reversible motor $M^1$ of Fig. 3.

In the operation of a frequency or speed control system of the character hereinbefore described and claimed in divisional application Serial No. 288,688, filed June 27, 1928, the frequency of an alternating or fluctuating current is in effect determined or measured, as in the case of Figs. 1 and 1ª, or equivalent, and in addition, a frequency or speed control is effected.

It will further be understood that my invention is not limited to the measurement of frequencies of 25, 60 or more cycles per second as commonly utilized on power and lighting circuits, but comprehends also the measurement of higher frequencies, including the so-called high or radio frequencies.

For brevity in the appended claims, the term "frequency" is employed in a generic sense to include frequency, speed, or equivalent magnitude proportional to or dependent upon frequency or speed.

What I claim is:

1. The method of measuring frequency by a Wheatstone bridge having combinations of resistance and reactance in different bridge arms, which comprises effecting balance of the bridge by varying the relative magnitudes of impedances in the bridge arms to effect equality between the ratio of the resistance components of two arms of the bridge, the ratio of the reactance components of said arms of the bridge, and the ratio of the impedances of the other arms of the bridge.

2. Apparatus for measuring frequency comprising a Wheatstone bridge, a conjugate conductor of said bridge including a source of fluctuating current, a fluctuating current galvanometer connected in the other conjugate conductor of said bridge, means for energizing the field of said galvanometer from said source, combinations of resistance and reactance in certain arms of said bridge, impedances in the other arms of said bridge, means for adjusting the relation of the magnitudes of the impedances in said first named arms of said bridge, and means for complementarily adjusting the relation of the magnitudes of the impedances in said other arms of said bridge for effecting equality between the ratio of the resistance components of said first named arms of said bridge, the ratio of the reactance components of said first named arms of said bridge, and the ratio of the impedances of said other arms of said bridge.

3. Apparatus for measuring frequency comprising a Wheatstone bridge, a conjugate conductor of said bridge including a source of fluctuating current, a fluctuating current galvanometer connected in the other conjugate conductor of said bridge, means for energizing the field of said galvanometer from said source, combinations of resistance and reactance in arms of said bridge, impedances in the other arms of said bridge, members constituting the terminals of said second conjugate conductor movable in unison for varying the relative magnitude of the impedances in said first named arms and for complementarily varying the relative magnitude of the impedances in said other arms of said bridge to effect equality between the ratio of the resistance components of said first named arms of said bridge, the ratio of the reactance components of said first named arms of said bridge, and the ratio of the impedances of said other arms of said bridge, and relatively movable scale and pointer members one of which is movable with said members.

4. Apparatus for measuring frequency comprising a Wheatstone bridge, a conjugate conductor of said bridge including a source of fluctuating current, a fluctuating current galvanometer connected in the other conjugate conductor of said bridge, means for energizing the field of said galvanometer from said source, a condenser and resistance in parallel with each other in one arm of said bridge, a condenser and resistance in series with each other in a second arm of said bridge, a slide wire connecting said arms, impedances in the other arms of said bridge, a second slide wire connecting said other arms, contacts constituting the terminals of said second named conjugate conductor coacting with said slide wires for effecting balance of said bridge by effecting equality between the ratio of the resistance components of said first and second named arms of said bridge, the ratio of the reactance components of said first and second named arms of said bridge, and the ratio of the impedances of said other arms of said bridge.

5. Apparatus for measuring frequency comprising a Wheatstone bridge, a conjugate conductor of said bridge including a source of fluctuating current, a fluctuating current galvanometer connected in the other conjugate conductor of said bridge, means for energizing the field of said galvanometer from said source, a condenser and resistance in parallel with each other in one arm of said bridge, a condenser and resistance in series with each other in a second arm of said bridge, a slide wire connecting said arms, impedances in the other arms of said bridge, a second slide wire connecting said other arms, contacts constituting the terminals of said second named conjugate conductor co-acting with said slide wires for effecting balance of said bridge by effecting equality between the ratio of the resistance components of said first and second named arms of said bridge, the ratio of the reactance components of said first and second named arms of said bridge, and the ratio of the impedance of said other arms of said bridge, means effecting movement of said contacts in unison with each other, and scale and pointer members movable relatively to each other and one of which is movable in unison with said contacts.

6. The combination with a Wheatstone bridge, of a source of fluctuating current in a conjugate conductor thereof, a fluctuating current galvanometer in the other conjugate conductor of said bridge, means for exciting said galvanometer from said source, a reactance and resistance in parallel therewith in one arm of said bridge, a reactance and resistance in series therewith in a second arm of said bridge, an impedance connecting said arms and co-acting with a terminal of said second named conjugate conductor, impedances in the other arms of said bridge, and an impedance connecting said other arm and co-acting with the other terminal of said second named conjugate conductor effecting a supplementary adjustment for effecting true balance of said bridge without effect by shifting of phase of the current in said galvanometer-exciting means.

7. In combination, a Wheatstone bridge having combinations of reactance and resistance in different bridge arms, impedances in the other bridge arms, a source of fluctuating current in a conjugate conductor of said bridge, a fluctuating current galvanometer in the other conjugate conductor of said bridge, means for exciting the galvanometer field from said source, movable structure controlled by said galvanometer when said bridge is unbalanced, means controlled by said movable structure for effecting balance of said bridge comprising means for effecting adjustments of the relative magnitudes of impedance in the different pairs of bridge arms to effect equality between the ratio of the resistance components of said first named arms, the ratio of the reactance components of said first named arms, and the ratio of the impedances of said other arms.

8. The method of measuring frequency which comprises impressing a fluctuating current upon an electrical network balanced at a predetermined frequency, balancing the network at the frequency of the impressed current by varying the magnitude and distribution of impedance included in the network, and determining from the magnitude of said variation of impedance the difference between the impressed and predetermined frequencies.

9. Apparatus for measuring frequency comprising an electrical network, a source of fluctuating current connected thereto, means indicating balanced condition of said network, structure movable to effect balance of said network at the frequency of said fluctuating current, and means associated with said movable structure to indicate the frequency at which said network is balanced.

10. In a system of the character described, means having a certain frequency, adjustable means having a neutral position and responsive to different conditions of frequency, means providing an operating connection between said first and second-named means such as to bring said second-named means under the influence of said certain frequency of said first-named means, and means operable when said second-named means is under such influence to effect adjustment thereof in such wise as to cause the same to assume said neutral position.

FELIX WUNSCH.